United States Patent
Dick

(10) Patent No.: US 8,355,430 B1
(45) Date of Patent: Jan. 15, 2013

(54) ADAPTIVE DEMODULATION OF A DATA COMMUNICATION

(75) Inventor: Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 217 days.

(21) Appl. No.: 12/986,133

(22) Filed: Jan. 6, 2011

(51) Int. Cl.
- H03H 7/30 (2006.01)
- H03H 7/40 (2006.01)
- H03K 5/159 (2006.01)

(52) U.S. Cl. ........ 375/232; 375/230; 375/233; 375/235; 375/346; 375/350; 455/296; 455/303; 455/306; 455/307; 708/322; 708/323

(58) Field of Classification Search ............ 375/232, 375/230, 233, 235, 346, 350; 455/296, 303, 455/306, 307; 708/322, 323
See application file for complete search history.

(56) References Cited

U.S. PATENT DOCUMENTS

| | | | | |
|---|---|---|---|---|
| 6,088,389 | A * | 7/2000 | Larsson | 375/231 |
| 8,194,791 | B2 * | 6/2012 | Endres et al. | 375/326 |
| 2003/0194031 | A1 * | 10/2003 | Strolle et al. | 375/347 |
| 2005/0185743 | A1 * | 8/2005 | Li | 375/350 |

OTHER PUBLICATIONS

Haykin, S., "Adaptive Filter Theory", 4th Edition Prentice Hall, Sep. 24, 2001, pp. 208-290, Chapter 4, Section 4.3 to Chapter 5, Section 5.7, New Jersey, USA.

* cited by examiner

*Primary Examiner* — Phuong Phu
(74) *Attorney, Agent, or Firm* — LeRoy D. Maunu

(57) ABSTRACT

An embodiment of the invention pertains to demodulating a data communication into a sequence of symbols. In this embodiment, a first filter generates a first convolution between a first plurality of coefficients and the data communication. The data communication is a distortion of a first sequence of symbols selected from a plurality of symbols in a constellation. A first error circuit maps the first convolution to a second sequence of symbols. An adaption circuit adjusts the first coefficients until a convergence at a last one of the symbols in the second sequence. A second filter generates a second convolution between a second plurality of coefficients and the data communication. The second coefficients are initialized to the first coefficients from the adaption circuit. A second error circuit maps the second convolution to a third sequence of symbols.

20 Claims, 5 Drawing Sheets

ADAPTIVE DEMODULATION OF A DATA COMMUNICATION

FIELD OF THE INVENTION

An embodiment of the present invention generally relates to data communication, and more particularly to adaptive channel equalization.

BACKGROUND

Data communicated over wires may be distorted by reflections from impedance changes in the wires, and data communicated wirelessly may be distorted by reflections from various objects in the wireless communication media.

An equalizer at the receiver can compensate for this distortion after determining the propagation characteristics of the communication media. Typically, transfer of a fixed training sequence helps determine the propagation characteristics of the communication media. However, the fixed training sequence wastes bandwidth of the communication media.

One or more embodiments of the present invention may address one or more of the above issues.

SUMMARY

One or more embodiments of the invention provide circuits and methods of demodulating a data communication into a sequence of symbols. In one embodiment, a circuit comprises a first filter that generates a first convolution between a first plurality of coefficients and the data communication. The data communication is a distortion of a first sequence of symbols selected from a plurality of symbols in a constellation. The circuit further includes a first error circuit that maps the first convolution to a second sequence of symbols. An adaption circuit adjusts the first coefficients until a convergence at a last one of the symbols in the second sequence. A second filter of the circuit generates a second convolution between a second plurality of coefficients and the data communication. The second coefficients are initialized to the first coefficients from the adaption circuit. A second error circuit maps the second convolution to a third sequence of symbols.

In another embodiment, a circuit is provided for demodulating a data communication into a sequence of symbols, the data communication being a distortion by a channel of a first sequence of symbols selected from a plurality of symbols in a constellation. Each symbol in the first sequence encodes arbitrarily variable information. The circuit comprises a filter that generates a first convolution between a first plurality of coefficients and the data communication until a convergence. After the convergence, a plurality of second coefficients is initialized by the filter to the first coefficients, and the filter generates a second convolution between the second coefficients and all of the data communication. An error circuit is coupled to the filter and maps the first convolution to a second sequence of symbols until the convergence at a last one of the symbols in the second sequence. After the convergence, the error circuit maps the second convolution to a third sequence of symbols. Each symbol in the second and third sequences is selected from the constellation, and the third sequence includes a corresponding symbol for each symbol in the second sequence. An adaption circuit is coupled to the filter and to the error circuit. The adaption circuit adjusts the first coefficients for reducing an error value until the convergence in response to a function of the error value being less than a threshold at the last symbol in the second sequence. The error value for each symbol in the second sequence is a distance between a nominal encoding of the symbol and a portion of the first filtered communication corresponding to the symbol.

A method of demodulating a data communication into a sequence of symbols is provided in another embodiment. The method includes inputting, by a demodulator, the data communication that is a distortion by a channel of a first sequence of symbols selected from a plurality of symbols in a constellation. Each symbol in the first sequence encodes arbitrarily variable information. The data communication is filtered into a first filtered communication until a convergence. The first filtered communication is a convolution of a plurality of coefficients and the data communication. The first filtered communication is mapped into a second sequence of symbols selected from the constellation until the convergence. An error value is determined for each symbol in the second sequence until the convergence. The error value is a distance between a nominal encoding of the symbol and a portion of the first filtered communication corresponding to the symbol. The coefficients are adjusted for reducing the error value until the convergence. The convergence occurs in response to a function of the error value being less than a threshold at a last one of the symbols in the second sequence. The data communication is filtered into a second filtered communication. The second filtered communication is a convolution of the coefficients after the adjusting and the data communication. The second filtered communication is mapped into a third sequence of symbols selected from the constellation. The third sequence includes a corresponding symbol for each symbol in the second sequence.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION OF THE DRAWINGS

Figure 1:
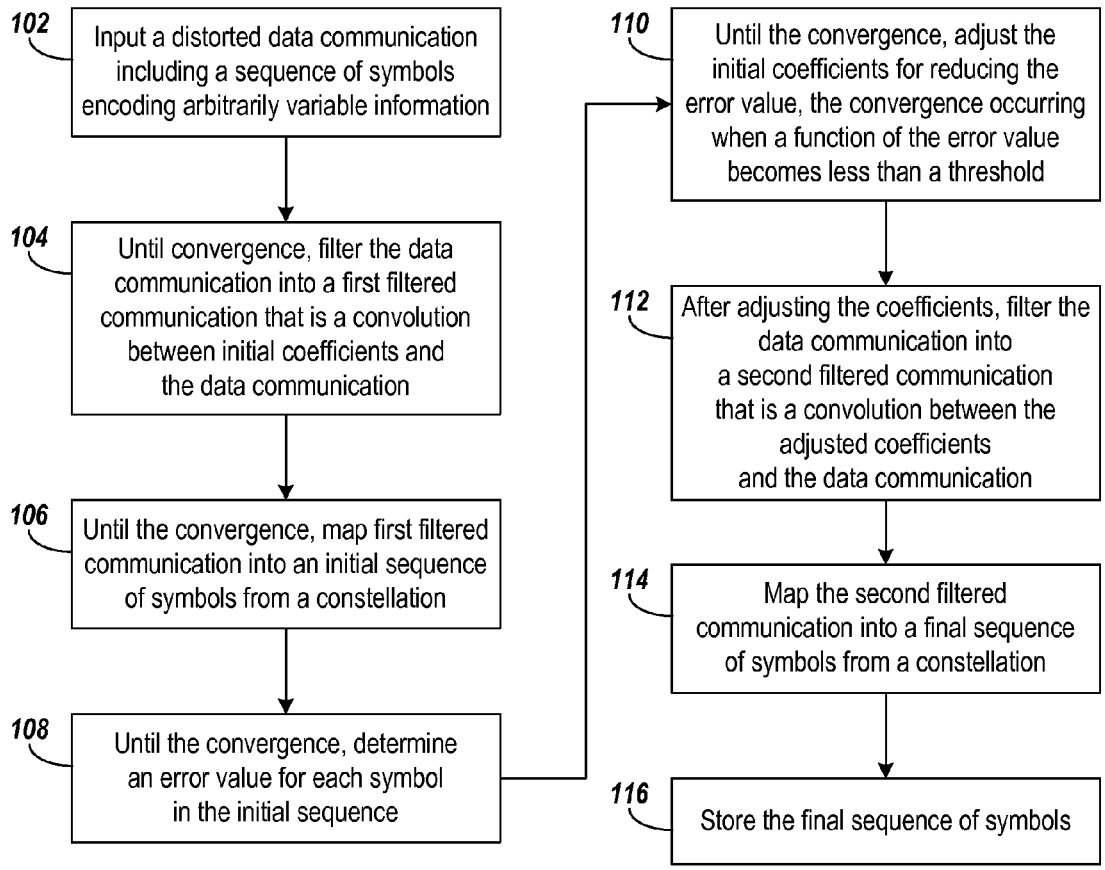
FIG. 1 is a flow diagram of a process for demodulating a data communication in accordance with an embodiment of the invention.

FIG. 1 is a flow diagram of a process for demodulating a data communication in accordance with an embodiment of the invention. A transmitter encodes the data communication as a sequence of symbols from a constellation, and a receiver receives the sequence of symbols via a communication channel that distorts the sequence of symbols. The receiver decodes the data from the distorted sequence without requiring any advance training to compensate for the channel distortion. Thus, the entire sequence can encode arbitrarily variable information without needing to dedicate a portion of the sequence to preset training information.

At step 102, the distorted data communication is input, and the input data includes a sequence of symbols selected from a constellation to encode arbitrarily variable information. At step 104, prior to convergence, the data communication is filtered into an initial convolution between default coefficients and the distorted data communication. The filtering can be performed by a demodulator which is described in greater detail below. At step 106, prior to convergence, the filtered communication from the initial convolution is mapped to an initially decoded sequence of symbols from the constellation. Because of the distortion by the channel, this initially decoded sequence of symbols generally does not fully match the symbols encoded at the transmitter.

At step 108, prior to convergence, an error value is determined for each symbol in the initially decoded sequence. The error value is a distance between a nominal encoding of the symbol and the portion of the initial convolution corresponding to the symbol. In one embodiment, each symbol in the initially decoded sequence is the symbol in the constellation closest to the portion of the initial convolution corresponding to the symbol. Thus, each symbol is selected to minimize the error value for the symbol.

At step 110, prior to convergence, the initial coefficients are adjusted to reduce the error values, and the convergence occurs when a function of the error values is reduced below a threshold. In one embodiment, adjustment ends upon convergence at the last symbol in the initially decoded sequence. In another embodiment, adjustment continues after convergence; however, the initially decoded sequence still ends upon convergence.

In one embodiment, the initial coefficients are adjusted according to the least mean squares for the error values of the symbols in the initially decoded sequence. For each symbol in the initially decoded sequence, a gradient of the error values with respect to the coefficients yields a modification vector for the coefficients. The coefficients are modified for each symbol by subtracting a scaling of the gradient from the coefficients. This modification of the coefficients generally reduces the error values for future symbols if the symbol was decoded to match the actually transmitted symbol. Because overall effect of this coefficient modification for incorrectly decoded symbols is to produce random noise, this coefficient modification tends to reduce the error values even for a sequence with many incorrectly decoded symbols. As the error values diminish, the decoding improves and eventually the coefficients converge to values that compensate for the distortion of the channel.

While prior art use of a fixed training sequence produces faster convergence because the symbols of the fixed training sequence are known and never incorrectly decoded, such a fixed training sequence wastes bandwidth of the communication channel. In one or more embodiments of the invention, the communication channel and its distortion change insignificantly during convergence, and the symbols received prior to convergence are decoded again using the filter coefficients obtained after convergence. Because these filter coefficients compensate for the channel distortion, the second decoding generally correctly decodes the symbols received prior to convergence. Thus, the filter coefficients are adjusted to compensate for the distortion of the communication channel without wasting any bandwidth of the communication channel.

At step 112, after convergence, the data communication is accordingly filtered into a second convolution between the adjusted coefficients and the distorted data communication received before and after convergence. At step 114 after convergence, the filtered communication from the second convolution is mapped to a finally decoded sequence of symbols from the constellation. Because the second filtering compensates for the distortion by the communication channel, this finally decoded sequence of symbols generally matches the symbols encoded at the transmitter. At step 116, the finally decoded sequence of symbols is stored in a memory device. Example memory devices include electronic, optical, and magnetic media.

Figure 2:
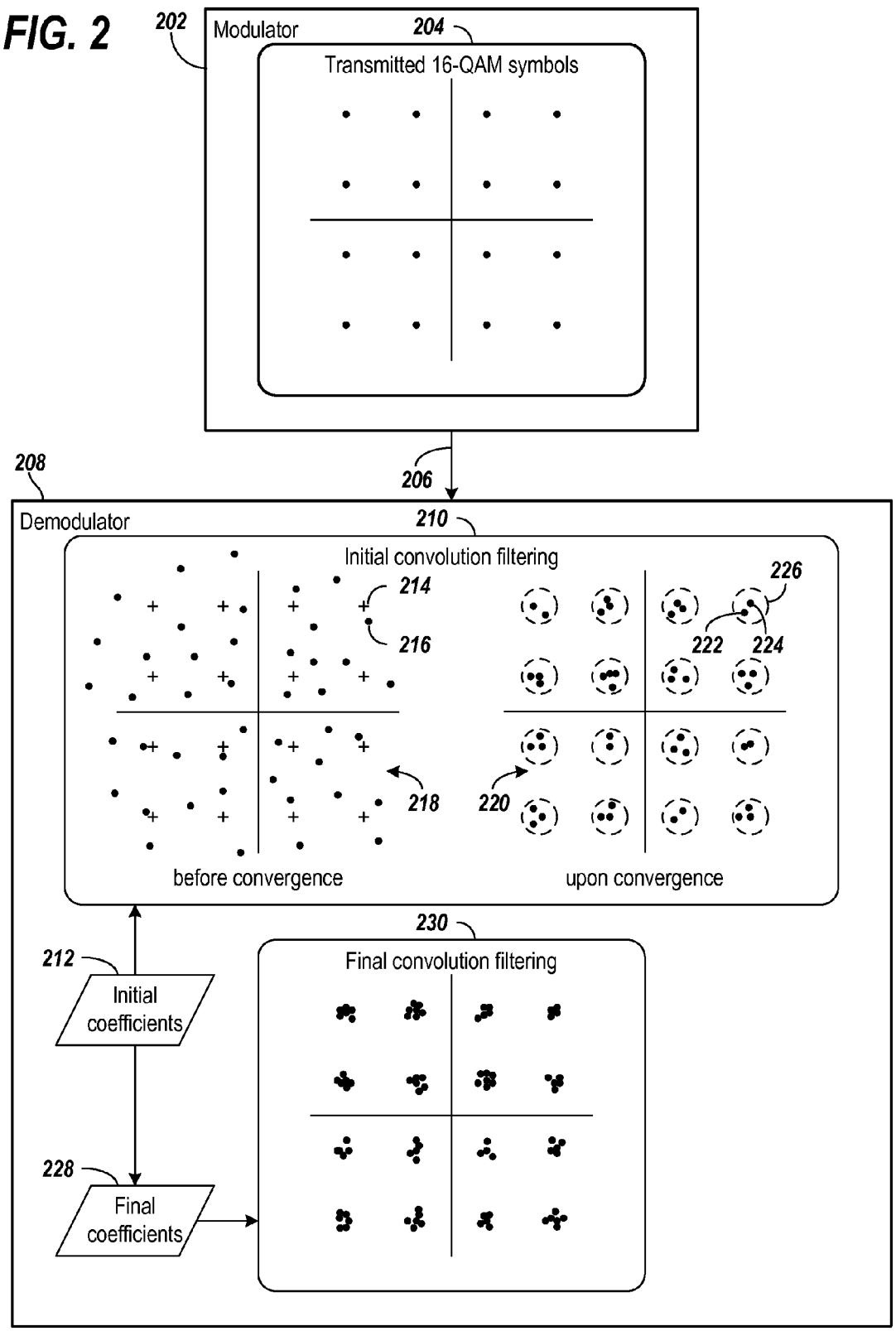
FIG. 2 is a block diagram of an example system for modulating and demodulating a data communication in accordance with an embodiment of the invention.

FIG. 2 is a block diagram of an example system for modulating and demodulating a data communication in accordance with an embodiment of the invention. A modulator 202 encodes arbitrarily variable data into a sequence of symbols for a quadrature amplitude modulation (QAM) constellation 204 having 16 symbols (16-QAM). Modulator 202 transmits the encoded symbols via communication channel 206 to demodulator 208.

The communication channel 206 distorts the symbols transmitted through channel 206. In one embodiment, channel 206 is a wireless communication channel distorting the symbols through multi-path interference. In another embodiment, channel 206 is a wired communication channel distorting the symbols through reflections from changes in the impedance of the wired communication channel.

The example demodulator 208 generates an initial filtering 210 that is a convolution between initial filter coefficients 212 and an initial subset of symbols from the sequence. In one embodiment, the default values of the initial filter coefficients 212 assume that the communication channel 206 did not distort the initial subset of symbols. If the channel 206 did not distort the initial subset of symbols, the received symbols would coincide with the nominal encodings, such as nominal encoding 214 (plus symbol), of the 16-QAM constellation. However, the communication channel 206 significantly distorts the received symbols, such as the received symbol 216, to produce an initially filtered data communication 218 that is apparently random in this example.

If symbol 216 is the first received signal, symbol 216 is initially decoded to be the symbol corresponding to the closest nominal encoding 214 of the 16-QAM constellation in one embodiment. The distance between distorted symbol 216 and nominal encoding 214 is the error value for distorted symbol 216. Incrementally changing each filter coefficient 212 and refiltering would move the filtered symbol 216 in various directions. Incrementally changing in the initial filter coefficients 212 by subtracting a step in the direction of a gradient of the error value with respect to the initial filter coefficients 212 would move the filtered symbol 216 towards the nominal encoding 214. If the symbol corresponding to nominal encoding 214 matches the actually transmitted symbol, this modification would generally adjust the initial filter coefficients 212 to compensate for the distortion caused by communication channel 206. Even though initially the closest nominal encoding does not always match the actually transmitted symbol, a series of similar adjustments for each received symbol eventually produces initial filter coefficients 212 that compensate for the distortion by channel 206.

In one embodiment, the adjustment of the initial filter coefficients 212 continues until the most recently received N filtered symbols have an error value that is less than a threshold. In one example, the last forty-four filtered symbols 220 (shown with dots) each have an error value that is within a threshold of one of the nominal encodings, for example, filtered symbols 222 and 224 each have an error value inside the threshold 226 of the nominal encoding 214. Convergence occurs upon the most recently received N filtered symbols 220 each having an error value that is less than the threshold.

In another embodiment, the adjustment of the initial filter coefficients 212 continues until the variance or standard deviation of the error values of the most recently received N filtered symbols is less than a threshold.

After convergence, the values of the initial filter coefficients 212 become the values of the final filter coefficients 228. A final filtering 230 filters again all the initial subset of symbols included in initial filtering 210. However, the final filtering 230 also filters symbols received after convergence. In one embodiment, adjustment of the final filter coefficients 228 continues for each filtered symbol in final filtering 230. The final filtering 230 is a convolution between the final filter coefficients 228 and the distorted symbols of the data communication received via communication channel 206. Because the final filter coefficients 228 compensate for the distortion from communication channel 206, the demodulator 208 readily and correctly maps the filtered symbols of the final filtering 230 to a final decoded sequence of symbols.

Figure 3:
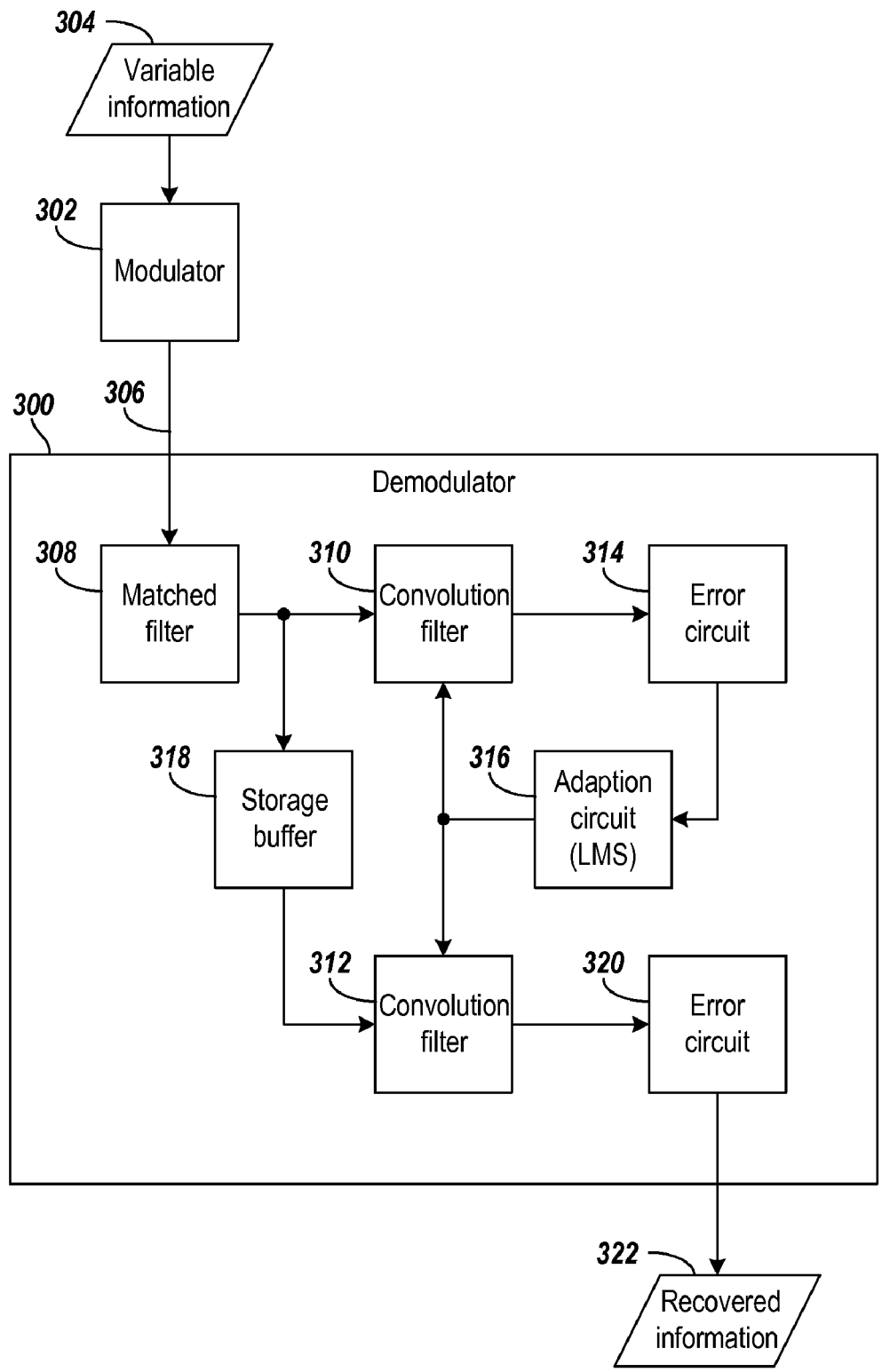
FIG. 3 is a data flow diagram illustrating a demodulator for demodulating a data communication in accordance with an embodiment of the invention.

FIG. 3 is a data flow diagram illustrating a demodulator 300 for demodulating a data communication in accordance with an embodiment of the invention. A modulator 302 encodes arbitrarily variable information 304 in symbols from a constellation, and modulator 302 transmits the encoded information to demodulator 300 via communication channel 306, which distorts the encoded information.

The demodulator 300 includes a low-pass matched filter 308 for attenuating noise at frequencies higher than the symbol rate of the data communication. The demodulator 300 includes two separate convolution filters 310 and 312.

Convolution filter 310 generates a filtered communication that is a convolution between initial filter coefficients and the distorted data communication from matched filter 308. Error circuit 314 determines an error distance between a portion of the filtered communication for each symbol and the nominal encoding for each of the symbols in the constellation. Error circuit 314 initially maps the portion of the filtered communication for each symbol to the symbol matching the nominal encoding that has the smallest error distance. Adaption circuit 316 adjusts the initial filter coefficients based on the error distance for each initially decoded symbol. After convergence of the error distances below a threshold at the last symbol initially decoded, adaption circuit 316 provides the converged filter coefficients to the second convolution filter 312, and signals the second convolution filter 312 to begin decoding.

While the adaption circuit 316 determines the initial filter coefficients that achieve convergence, storage buffer 318 stores the distorted data communication from matched filter 308. In one embodiment, storage buffer 318 is a first-in first-out (FIFO) buffer.

Convolution filter 312 generates another filtered communication that is a convolution between the converged filter coefficients and the distorted data communication from storage buffer 318. Error circuit 320 finally maps the filter communication from convolution filter 312 to the recovered information 322. Recovered information 322 nominally matches variable information 304.

Figure 4:
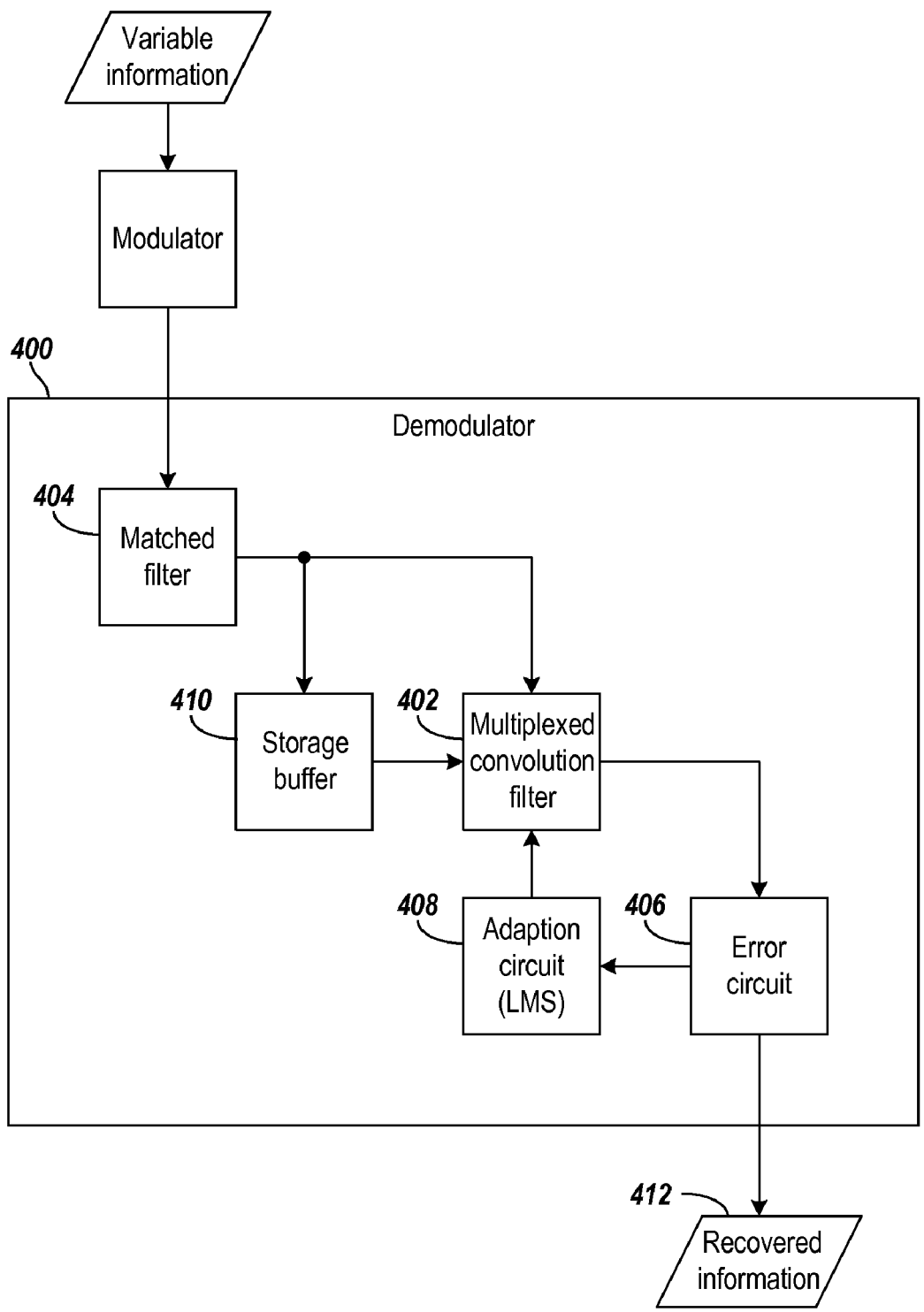
FIG. 4 is a data flow diagram illustrating another demodulator for demodulating a data communication in accordance with an embodiment of the invention.

FIG. 4 is a data flow diagram illustrating another demodulator 400 for demodulating a data communication in accordance with an embodiment of the invention. Instead of the two convolution filters 310 and 312 of FIG. 3, FIG. 4 includes a time-multiplexed convolution filter 402.

Convolution filter 402 generates a filtered communication that is a convolution between initial filter coefficients and the distorted data communication from matched filter 404. Error circuit 406 determines an error distance between a portion of the filtered communication for each symbol and maps the portion of the filtered communication to the symbol that has the smallest error distance. Adaption circuit 408 adjusts the filter coefficients based on the error distance for each decoded symbol.

After convergence of the error distances below a threshold, adaption circuit 408 signals the convolution filter 402 to regenerate a filtered communication that is a convolution between the filter coefficients and the distorted data communication stored in FIFO storage buffer 410 during the process of achieving convergence. Error circuit again decodes the recovered information 412 from this second filtered communication.

Figure 5:
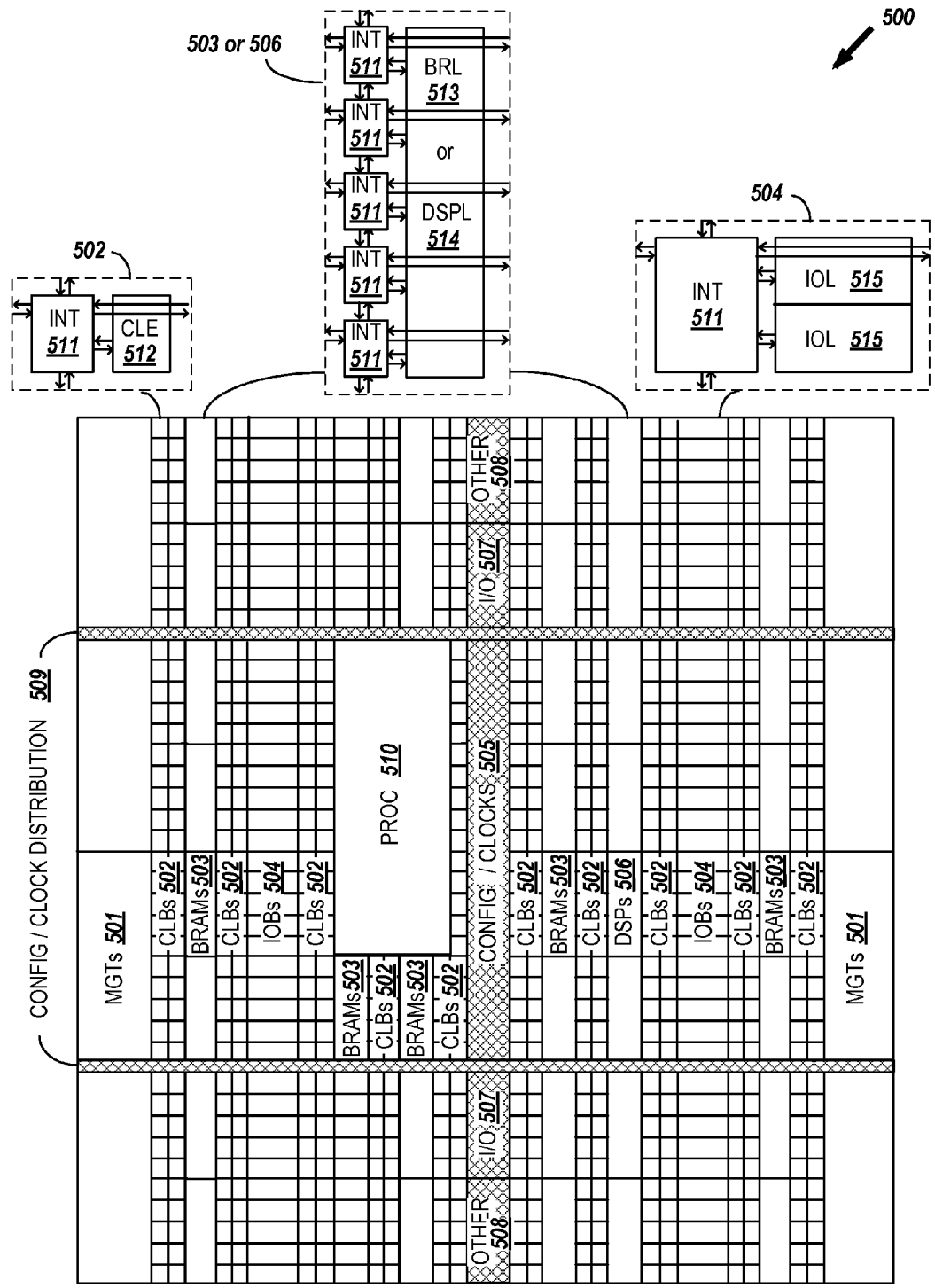
FIG. 5 is a block diagram of an example programmable logic integrated circuit that may be used in implementing a demodulation circuit in accordance with an embodiment of the invention.

FIG. 5 is a block diagram of an example programmable logic integrated circuit that may be used in implementing a demodulation circuit in accordance with an embodiment of the invention. A demodulator, as described above, may be implemented on the programmable logic and interconnect resources of programmable integrated circuit.

Field programmable gate arrays (FPGAs) can include several different types of programmable logic blocks in the array. For example, FIG. 5 illustrates an FPGA architecture 500 that includes a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing blocks (DSPs) 506, specialized input/output blocks (I/O) 507, for example, e.g., clock ports, and other programmable logic 508 such as digital clock managers, analog-to-digital converters, system monitoring logic, and so forth. Some FPGAs also include dedicated processor blocks (PROC) 510 and internal and external reconfiguration ports (not shown). In some FPGAs, each programmable tile includes a programmable interconnect element (INT) 511 having standardized connections to and from a corresponding interconnect element in each adjacent tile. Therefore, the programmable interconnect elements taken together implement the programmable interconnect structure for the illustrated FPGA. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic plus a single programmable interconnect element NT 511. A BRAM 503 can include a BRAM logic element (BRL) 513 in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 506 can include a DSP logic element (DSPL) 514 in addition to an appropriate number of programmable interconnect elements. An IOB 504 can include, for example, two instances of an input/output logic element (IOL) 515 in addition to one instance of the programmable interconnect element INT 511. As will be clear to those of skill in the art, the actual I/O pads connected, for example, to the I/O logic element 515 are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

One or more embodiments of the present invention are thought to be applicable to a variety of systems for demodulating a data communication. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A circuit for demodulating a data communication into a sequence of symbols, comprising:
    a first filter that generates a first convolution between a first plurality of coefficients and the data communication, wherein the data communication is a distortion by a channel of a first sequence of symbols selected from a plurality of symbols in a constellation;
    a first error circuit coupled to the first filter, wherein the first error circuit maps the first convolution to a second sequence of symbols;
    an adaption circuit coupled to the first filter and the first error circuit, wherein the adaption circuit adjusts the first coefficients until a convergence at a last one of the symbols in the second sequence;
    a second filter coupled to the adaption circuit, wherein the second filter generates a second convolution between a second plurality of coefficients and the data communication, wherein the second coefficients are initialized to the first coefficients from the adaption circuit; and
    a second error circuit coupled to the second filter, wherein the second error circuit maps the second convolution to a third sequence of symbols.

2. The circuit of claim 1, wherein each symbol in the first sequence encodes arbitrarily variable information.

3. The circuit of claim 1, wherein:
    for each symbol in the second sequence, the first error circuit generates respective distances for the symbols in the constellation and selects the symbol in the second sequence to be one of the symbols in the constellation having a smaller one of the respective distances, the respective distance being between a nominal encoding of each symbol in the constellation and a portion of the first convolution corresponding to the symbol in the second sequence, the first error circuit ending the second sequence at the last symbol upon the convergence in response to a function of the smaller respective distance being less than a threshold; and
    for each symbol in the third sequence, the second error circuit generates respective distances for the symbols in the constellation, the second error circuit selecting the symbol in the third sequence to be one of the symbols in the constellation having a smaller one of the respective distances, the respective distance being between the nominal encoding of each symbol in the constellation and a portion of the second convolution corresponding to the symbol in the third sequence.

4. The circuit of claim 1, further comprising a storage buffer coupled to the second filter, the storage buffer storing an initial segment of the data communication in advance of the convergence, the second filter generating the second convolution between the second coefficients and the data communication that includes the initial segment retrieved from the storage buffer following the convergence.

5. A circuit for demodulating a data communication into a sequence of symbols, the data communication being a distortion by a channel of a first sequence of symbols selected from a plurality of symbols in a constellation, each symbol in the first sequence encoding arbitrarily variable information, the circuit comprising:
    a filter that generates a first convolution between a first plurality of coefficients and the data communication until a convergence, and after the convergence a plurality of second coefficients is initialized to the first coefficients, and the filter generates a second convolution between the second coefficients and all of the data communication;
    an error circuit coupled to the filter, wherein the error circuit maps the first convolution to a second sequence of symbols until the convergence at a last one of the symbols in the second sequence, and after the convergence maps the second convolution to a third sequence of symbols, each symbol in the second and third sequences selected from the constellation, the third sequence including a corresponding symbol for each symbol in the second sequence; and
    an adaption circuit coupled to the filter and the error circuit, wherein the adaption circuit adjusts the first coefficients for reducing an error value until the convergence in response to a function of the error value being less than a threshold at the last symbol in the second sequence, wherein the error value for each symbol in the second sequence is a distance between a nominal encoding of the symbol and a portion of the first filtered communication corresponding to the symbol.

6. The circuit of claim 5, wherein the first sequence of symbols encodes the arbitrarily variable information and the third sequence of symbols nominally encodes the arbitrarily variable information.

7. The circuit of claim 5, further comprising a storage buffer coupled to the filter, the storage buffer storing an initial segment of the data communication before the convergence, wherein after the convergence the filter generates the second convolution between the second coefficients and all of the data communication that includes the initial segment retrieved from the storage buffer.

8. A method of demodulating a data communication into a sequence of symbols, comprising:
    inputting the data communication that is a distortion by a channel of a first sequence of symbols selected from a plurality of symbols in a constellation, wherein each symbol in the first sequence encodes arbitrarily variable information;
    filtering, by a demodulator, the data communication into a first filtered communication until a convergence, wherein the first filtered communication is a convolution of a plurality of coefficients and the data communication;

mapping the first filtered communication into a second sequence of symbols selected from the constellation until the convergence;

determining an error value for each symbol in the second sequence until the convergence, wherein the error value is a distance between a nominal encoding of the symbol and a portion of the first filtered communication corresponding to the symbol;

adjusting the coefficients for reducing the error value until the convergence, wherein the convergence occurs in response to a function of the error value being less than a threshold at a last one of the symbols in the second sequence;

after the adjusting, filtering the data communication into a second filtered communication, wherein the second filtered communication is a convolution of the adjusted coefficients and the data communication; and mapping the second filtered communication into a third sequence of symbols selected from the constellation, wherein the third sequence includes a corresponding symbol for each symbol in the second sequence.

9. The method of claim 8, wherein:

the inputting of the data communication includes inputting the data communication that is the distortion by the channel of the first sequence including an initial sequence of the symbols in the first sequence, each symbol in the initial sequence encoding arbitrarily variable information; and the filtering of the data communication into the first filtered communication includes filtering the distortion by the channel of the initial sequence into the portion of the first filtered communication corresponding to the symbols in the second sequence.

10. The method of claim 9, wherein the mapping of the first filtered communication into the second sequence includes mapping a corresponding symbol in the second sequence for each symbol in the initial sequence.

11. The method of claim 8, wherein the function of the error value is the error value.

12. The method of claim 8, wherein the function of the error value for each symbol in the second sequence is a variance of the error value for a subset of the symbols in the second sequence prior to and including the symbol in the second sequence.

13. The method of claim 8, wherein the mapping of the first filtered communication into the second sequence of symbols includes, for each symbol in the second sequence, determining respective distances for the symbols in the constellation, the respective distance being between a nominal encoding of each symbol in the constellation and the portion of the first filtered communication corresponding to the symbol in the second sequence, and selecting the symbol in the second sequence to be one of the symbols in the constellation having a smaller one of the respective distances; and wherein the mapping of the second filtered communication into the third sequence of symbols includes, for each symbol in the third sequence, determining respective distances for the symbols in the constellation, the respective distance being between the nominal encoding of each symbol in the constellation and a portion of the second filtered communication corresponding to the symbol in the third sequence, and selecting the symbol in the third sequence to be one of the symbols in the constellation having a smaller one of the respective distances.

14. The method of claim 13, wherein the determining of the error value for each symbol in the second sequence includes setting the error value to the smaller respective distance for the symbol in the second sequence.

15. The method of claim 14, wherein the adjusting of the coefficients includes, for each symbol in the second sequence, determining a gradient with respect to the coefficients of the error value of the symbol, and subtracting from the coefficients a scaling of the gradient.

16. The method of claim 8, wherein the adjusting of the coefficients includes adjusting the coefficients according to a least mean squares for the error value of the symbols in the second sequence.

17. The method of claim 8, wherein the adjusting of the coefficients includes, for each symbol in the second sequence, determining a gradient with respect to the coefficients of the error value of the symbol, and subtracting from the coefficients a scaling of the gradient.

18. The method of claim 8, further comprising:

determining another error value for each symbol in the third sequence, wherein the other error value is a distance between a nominal encoding of the symbol and a portion of the second filtered communication corresponding to the symbol; and adjusting the coefficients for reducing the another error value after the convergence.

19. The method of claim 8, wherein the filtering of the data communication into the second filtered communication compensates for the distortion by the channel and ensures that the third sequence of symbols nominally matches the first sequence of symbols.

20. The method of claim 8, further comprising storing an initial segment of the data communication in a buffer, the initial segment ending at a portion of the data communication corresponding to the last symbol in the second sequence at which the function of the error value becomes less than the threshold, wherein the filtering of the data communication into the second filtered communication includes retrieving the initial segment of the data communication from the buffer after the function of the error value becomes less than the threshold.

* * * * *